United States Patent [19]
Davis et al.

[11] 4,029,187
[45] June 14, 1977

[54] CLUTCH WITH CENTRIFUGALLY ACTUATED SPRINGS

[75] Inventors: Marion H. Davis; John W. Cleghorn, both of Hagerstown, Ind.

[73] Assignee: Pay-Bak, Inc., Hagerstown, Ind.

[22] Filed: June 16, 1975

[21] Appl. No.: 587,254

[52] U.S. Cl. ............... 192/105 BA; 192/105 CE; 192/105 A; 192/113 A
[51] Int. Cl.² ............................................. F16D 43/14
[58] Field of Search ............. 192/105 BA, 105 CD, 192/103 B, 76, 105 A, 105 CE

[56] References Cited
UNITED STATES PATENTS

| | | | |
|---|---|---|---|
| 2,386,645 | 10/1945 | Williams | 192/105 BA |
| 2,392,950 | 1/1946 | Russell | 192/105 CE |
| 2,491,003 | 12/1949 | Elmore | 192/105 B |
| 2,623,400 | 12/1952 | Davis | 192/105 CE |
| 2,707,542 | 5/1955 | Thompson | 192/105 CE |
| 2,718,294 | 9/1955 | Armstrong | 192/105 BA |
| 2,722,304 | 11/1955 | Kiekhaefer | 192/105 CE |
| 3,101,625 | 8/1963 | Horvath | 192/105 CE |
| 3,385,411 | 5/1968 | Collins | 192/105 BA |

*Primary Examiner*—Benjamin W. Wyche
*Attorney, Agent, or Firm*—Dybvig & Dybvig

[57] ABSTRACT

A clutch assembly for controlling the transfer of rotation from a rotatable driving member to a rotatably mounted driven member comprises a spider driven within a drum having an interior wall surrounding the spider. The spider has outwardly radiating arms which receive clutch shoes between alternate pairs of adjacently disposed arms. The clutch shoes are equipped with outrigger means providing anchors for the ends of springs which interconnect circumferentially adjacent clutch shoes. The outrigger means support the ends of the springs circumferentially outwardly from the clutch shoes in a position which enables centrifugal forces to bow the springs outwardly and thus change the direction of force exerted by the springs on the clutch shoes.

19 Claims, 5 Drawing Figures

U.S. Patent June 14, 1977 4,029,187
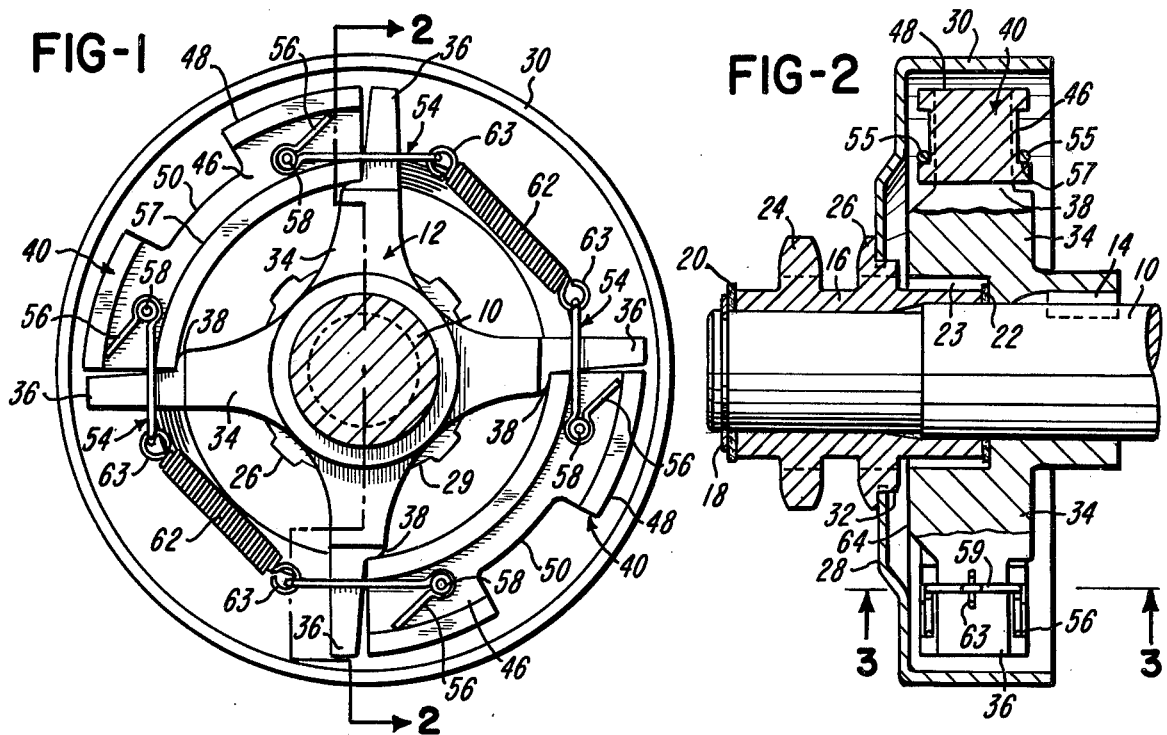
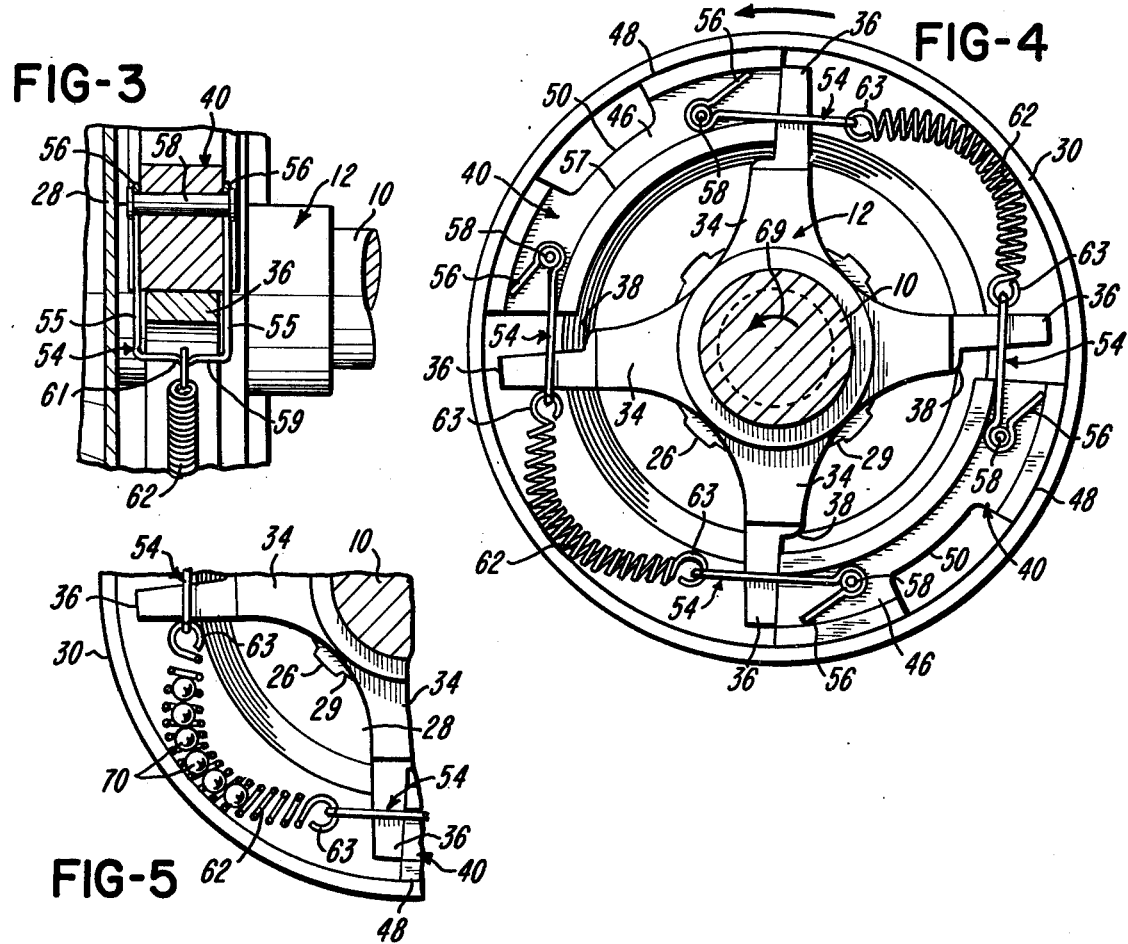

CLUTCH WITH CENTRIFUGALLY ACTUATED SPRINGS

BACKGROUND OF THE INVENTION

1. Field of the Invention

This invention relates to centrifugally operated clutch mechanisms and more particularly to rotary clutch mechanisms in which the clutch shoes have outrigger means supporting springs at positions which allow centrifugal forces to change the direction in which the springs act. The present invention also relates to improved heat dissipation means for centrifugal clutch devices.

2. Description of the Prior Art

Prior patents disclosing centrifugal clutches and related devices are as follows:

| | | |
|---|---|---|
| 2,171,837 | 2,718,294 | 3,018,864 |
| 2,203,862 | 2,722,304 | 3,101,625 |
| 2,386,645 | 2,850,131 | 3,506,101 |
| 2,610,718 | 2,976,975 | |
| 2,623,400 | 2,707,542 | |

SUMMARY OF THE INVENTION

The foregoing prior art teaches the formation of centrifugal clutches by means of circumferentially spaced clutch shoes interconnected by springs and driven by a spider having arms interposed between the circumferentially spaced clutch shoes. The present invention differs from such prior art in that the springs interconnecting the clutch shoes are so sized and mounted to the clutch shoes that the springs are able to be bowed outwardly by centrifugal forces. The outward bow of the springs is utilized beneficially in the present invention to permit the direction in which the springs act to shift from a tension pulling the clutch shoes radially inwardly to a tension pulling the clutch shoes circumferentially or, at least, not strongly pulling the clutch shoes inwardly. This result is aided in the present invention by equipping the clutch shoes with outrigger means which anchor the tension springs at positions allowing the outward bow of the springs to change the direction in which the springs act.

In further summary of the present invention, a new clutch shoe construction along with refinements in the design of the spider which drives the clutch shoes provides improved heat dissipation.

It is accordingly an object of the present invention to provide a new and improved centrifugal clutch mechanism.

A further object of this invention is to provide a new and improved clutch shoe configuration for use in centrifugal clutches.

Still another object of this invention is to provide a new and improved mounting for springs which interconnect the clutch shoes of a centrifugal clutch mechanism, the mounting allowing the springs to bow under the influence of centrifugal forces and thereby change the direction in which the spring forces act upon the clutch shoes.

Still a further object of the present invention is to provide a clutch construction with improved heat dissipation qualities.

Other objects and advantages reside in the construction of parts, the combination thereof, the method of manufacture and the mode of operation, as will become more apparent from the following description.

BRIEF DESCRIPTION OF THE DRAWINGS

FIG. 1 is a plan view with a portion broken away illustrating a clutch mechanism embodying the present invention.

FIG. 2 is a section view taken substantially along the line of 2—2 of FIG. 1.

FIG. 3 is a fragmentary section view taken substantially along the line 3—3 of FIG. 2.

FIG. 4 is a plan view illustrating an operative mode of the present invention.

FIG. 5 is a fragmentary plan view illustrating an operative mode of a modification.

DESCRIPTION OF THE PREFERRED EMBODIMENTS

THe clutch mechanism illustrated in the drawings is adapted for assembly onto the output shaft 10 of any suitable driving means such as a gasoline engine or an electric motor, not shown. The clutch mechanism includes a spider 12 received on the shaft 10 and non-rotatably secured to the shaft 10 by means of a key 14.

Journaled for rotation on the shaft 10 is a transmission member 16 adapted to be controllably driven by operation of the clutch mechanism. The transmission member 16 is axially located on the shaft 10 by means of a spring clip 18 seated in a suitable groove in the shaft 10. Fibrous washers 20 and 22 located adjacent the opposite ends of the member 16 minimize friction between the member 16 and the spring clip 18 at one end thereof and the spider 12 which has an annular opening 23 receiving the opposite end of the member 16.

For purposes of torque transmission, the member 16 has integrally formed teeth 24 forming a sprocket for engaging a suitable transmission belt or chain, not shown. Other torque transmission means such as pulleys and gears are comprehended within the present invention.

The member 16 also includes a second annular array of teeth 26 which have been cut away on the right faces thereof as they appear in FIG. 2 to provide a notched, cylindrical hub 32 adapted to interfit a similarly shaped opening located centrally in a closure means 28 for a drum member 30. Thus, as appears in FIG. 2, the central opening in the closure means 28 includes an annular array of teeth 29 which interfit the notches in the hub 32. The drum 30 is fixedly secured to the member 16 by any suitable means such as a pressed fit, staking or the like.

As thus far described, the drum member 30 is free to rotate with respect to the shaft 10 and with respect to the spider 12. A driving connection between the shaft 10 and the drum member 30 is established in accordance with the present invention by means of a centrifugally operated clutch mechanism which will now be described.

As best appears in FIG. 1, the spider 12 comprises four equiangularly spaced spokes or arms 34 which extend outwardly in a direction generally radial with respect to the rotary axis of the shaft 10. At an intermediate point on its length, the thickness of each of the spokes as they appear in FIG. 1 is rather abruptly reduced to provide each of the spokes with a shoulder 38. It will be noted that one pair of diametrically disposed spokes has their shoulders located upon the clockwise sides thereof as appears in FIG. 1 while the other pair of diametrically disposed spokes has their shoulders 38 located on the counterclockwise sides thereof.

As appears in FIG. 1, the shoulders 38 provide seats for the ends of diametrically disposed arcuate clutch shoes 40, each of the clutch shoes 40 subtending an angle of approximately 90° about the axis of the shaft 10 when seated against the shoulders 38 as shown in FIG. 1.

As will become apparent, the teachings of the present invention are not limited to spiders having four spokes. In general, a spider suitable for use in the present invention will have its spokes or arms arranged at substantially equal angles with clutch shoes subtending an appropriate angle being disposed between alternate pairs of adjacently disposed arms, provided with shoulders as shown, the empty gaps or pockets between such alternate pairs being open and unfilled except as will be described.

Each of the spokes 34 has an outer end 36 which serves as a shoe driver and is of gradually diminishing thickness from the shoulder or seat 38 to the radially outer end of the spoke. It will also be noted that each of the spokes 34 terminates in spaced apart relation to the drum member 30 whereby the spider 12 is free to rotate within the drum member 30.

The shoes 40 are preferably a metal or an alloy which has been heat treated or tempered to withstand the high temperatures that will be encountered in the operation to be described. The shoes have been milled or otherwise formed to have inwardly indented side walls 46. The outer surface 48 of each shoe is interrupted by an axially extending notch 50 which, as will be further explained, is sized to optimize friction forces that will be developed between the shoes 40 and the drum 30 during the operation of the clutch mechanism.

Secured to each end of each of the shoes 40 is a stirrup member 54 which, as seen in FIG. 3, is secured in straddling relation to the shoe by means of a single hollow or tubular rivet 58. The stirrups 54 can be seen to comprise single lengths of a wire which has been shaped to a generally "U" shape with both ends of the wire curved to form hooks 56 which partially encircle and are seized by the rivets 58. One function of the hooks 56 is to act within the indented side walls 46 to bias the side arms 55 of the stirrup into firm contact with the inner margins 57 of the indented side walls 46. The hooks 56 thus cooperate with the rivets 58 and the side arms 55 of the stirrups to firmly anchor the stirrups against pivotal motion with respect to the shoes 40.

It can be noted that each of the stirrups 54 has a base 59 spaced apart from its shoe 40 and spanning the width of the shoes between the indented walls 46. The bases are so spaced from the shoes that the clutch drivers 36 can be received within the stirrups with a considerable tolerance for a circumferential movement of the drivers 36 within the stirrups.

Each of the bases 59 has an indentation 61 adapted to seat a hook 63 formed at one end of a helically coiled tension spring 62. The opposite end of the same spring is hooked to a circumferentially adjacent stirrup of the opposite clutch shoe. The springs are stretched and thus under tension. Assuming a condition in which the spider 12 is not rotating at a high speed, the resulting arrangement is such that the two springs 62 are disposed mutually parallel on opposite sides of the shaft 10 as illustrated in FIG. 1.

FIG. 4 illustrates the condition of the clutch mechanism of FIG. 1 when the rotational speed of the spider 12 has been increased just sufficiently to cause a clutch engagement. A comparison between FIGS. 1 and 4 will show that by the time of clutch engagement, the springs 62 have swung outwardly under the influence of centrifugal forces toward the drum 30, thus substantially relieving the radially inward force which was exerted on the clutch shoes 40 when the spider was at rest. Thus, it can be noted that the springs 62 have swung outwardly to a position in which the direction of pull exerted by the springs on the clutch shoes 40 is primarily a circumferential pull and to some extent a radial outward pull.

In the preferred construction, the springs 62 are provided with a force constant, which, in reference to the mass associated with the springs 62, allows the springs to swing outwardly to contact, or at least nearly contact, the drum 30 at substantially the same rotary velocity that causes the clutch shoes 40 to contact the drum 30. While, as indicated, the springs 62 may contact the drum 30 at the time of clutch engagement, this is not required.

Those skilled in the art will appreciate that the time of clutch engagement is the time when the clutch is most sensitive to changes in rotary velocity. Thus, as the clutch engages, the inertia of the clutch and any mechanism to be driven through the clutch must be overcome before clutch engagement is complete. Some deceleration of the clutch spider can therefore be anticipated. If such deceleration is sufficient to permit the springs to retract the clutch shoes from the drum 30, the clutch will disengage until the speed of the spider can increase sufficiently to return the clutch shoes 40 to the drum 30. This condition is known in the art as clutch "chatter". It results in part from too strong a radial inward force being exerted on the clutch shoes 40.

With the present invention, wherein the springs 62 have been designed to swing outwardly under the influence of centrifugal forces and thus subtantially relieve radially inward forces, the problems with clutch chatter are very materially reduced.

It will be noted that as the shoes 40, and perhaps the springs 62, first engage the drum 30, a frictional slippage with respect to the drum 30 is unavoidable. Thus the drum 30 cannot rotate with the shoes 40 until the inertia of the drum and any load associated therewith has been overcome. Until the inertia is overcome, the shoes inevitably slip with respect to the drum. It is accordingly contemplated that there will be a substantial generation of heat as the shoes engage the drum 30.

It is helpful to consider some motions that occur as the shoes 40 slidlingly engage the drum 30. Due to the symmetric design of the shoes, the symmetric locations of the springs, and the symmetry of design associated with the spider 12, the shoes will tend to move oppositely outwardly from their seats 38 to engage the drum 30. As the shoes leave their seats 38, they continue to be driven by the spider 12. Thus, as appears in FIG. 4 wherein a direction of rotation has been slowly by the arrow 69, a pair of diametrically opposite spokes will be firmly abutted against trailing ends of the shoes while a relative shift in position between the spider and the shoes will have opened substantial gaps between the leading ends of the shoes and the remaining pair of spokes 34. The spokes have been carefully shaped in recognition that the described shift in the position of the shoes will occur.

Thus, it is preferred that the shapes of the clutch drivers 36 and the ends of the shoes 40 be so designed that the interface between the shoes and the clutch drivers during periods of clutch engagement is substantially radial with respect to the axis of rotation of the shaft 10, the consequence being that the spokes tend neither to lift the shoes away from the drum 30 nor unduly load the shoes so as to retard disengagement of the clutch.

FIG. 5 illustrates a modification in which the springs 62 have been weighted to lower the angular velocity at which the springs will switch from a primarily radial pull to a primarily circumferential pull exerted on the shoes 40. In this modification, a number of weights in the form of a suitably sized balls 70 are placed within the interior of the springs 62. The balls 70 closely fit the inside spring diameter and substantially fill the spring lengths when the springs are in the chordal position illustrated in FIG. 1. As the springs develop a bow, as illustrated in FIG. 5, the balls 70 seek radially outermost positions, and, accordingly concentrate near the point of contact between the springs in which they are housed and the interior wall of the drum 30. The balls 70 provide a means whereby the angular velocity at which the springs will shift from radial to circumferential pulls may be decreased with reference to the angular velocity at which the springs will permit the clutch shoes to engage the drum 30. It will be apparent to those skilled in the art that weights of other sizes and shapes disposed either internally or externally of the springs 62 can be utilized for the same purposes.

It is to be noted, that the clutch mechanism is bi-directional in the sense that the clutch mechanism operates in the same fashion whether the shaft 10 is being rotated in a clockwise or a counterclockwise direction. It is found highly desirable that the leading and trailing corners of the clutch shoes 40 are sharply formed angles, which are preferably right angles. As the clutch is repeatedly engaged and disengaged and subjected to substantial heat generation during clutch engagement, abrasively released debris can be expected to accumulate on the interior wall of the drum 30. By forming the leading and trailing corners of the clutch shoes as sharp angles, these corners become effective to scrape and dislodge the accumulated debris.

By reason of the shape of the spider disclosed in the drawings it is desirable that the clutch shoes 40 subtend approximately 90° about the axis of rotation of the shaft 10 when the clutch shoes are seated on the seats 38. For most applications, however, this will produce outer surfaces for the clutch shoes which unless reduced in area, are too large to provide an effective radially outward force per unit of shoe area. Accordingly it is found desirable to limit the area of the outer surface 48. Inasmuch as sharp corners are found desirable at the leading and trailing ends of the clutch shoes it is also found desirable to limit the area of the outer surface 48 by providing the centrally disposed notch therein, thus doubling the number of sharp corners available to scrape accumulating debris from the interior wall of drum 30.

The notches 50 provide a further advantage in that air is permitted to circulate centrally through the clutch shoes thus extracting some of the heat generated when the outer surfaces of the clutch shoes slidingly engage the drum 30. For the same purpose the rivets 58 are formed as tubular rivets so that air may circulate through the rivets.

The circulation of air about the clutch means is enhanced in the present invention by the shape of the spokes 34. Thus as appears in FIGS. 1 and 2 the spokes are in the shape of blade-like members whose thickness is substantially less than their width. Further the side edges of the spokes which confront the closure means 28 of the drum 30 are shaped or sculptured to complement the shape or sculpturing of the closure means 28.

More particularly the side edges are formed with wings 64 which agitate the air disposed within the drum 30 and located adjacent the closure means 28.

Directing particular attention to FIG. 2, it will be noted that the axial dimension of the interior wall of the drum 30 is substantially greater than the axial dimensions of the clutch shoes 40. This dimensional relationship is desired so that the drum 30 can serve as a heat sink in regions not directly contacted by the clutch shoes. In particular, it is desirable that a notable overhang exist at the free edge of the clutch drum so as to enable heat to be sinked at the free edge where the heat can be efficiently dissipated by radiation and the movement of the air currents about the free edge of the drum.

Although a preferred embodiment of this invention has been described, it will be understood that various changes may be made within the scope of the appended claims.

Having thus described our invention, we claim:

1. In a centrifugal clutch of the type comprising a driven drum rotatable about a rotary axis, a driving spider rotatable about the same axis and disposed concentrically within said drum, said spider having plural arms radiating outwardly toward the interior wall of said drum, clutch shoes received between diametrically opposite pairs of said arms, and yielding means connected between said shoes to resist centrifugal actuation of said shoes toward said interior wall on rotation of said spider; the improvement wherein said yielding means comprise spring means disposed to opposite sides of said rotary axis, said spring means drawing said clutch shoes radially inwardly toward said rotary axis in the absence of spider rotation, said spring means sized as to mass and force constant to bow outwardly away from said rotary axis toward the interior wall of said drum to positions in which said spring means draw said clutch shoes primarily in a circumferential direction about said rotary axis, the size and mass of said spring means predetermined to cause said spring means to shift the direction in which said spring means draw said clutch shoes from a radial direction to a circumferential direction at substantially the same angular velocity of said spider as required to centrifugally actuate said clutch shoes to engagement with the interior wall of said drum.

2. The clutch assembly of claim 1 in which said spring means have weights engaged thereto.

3. The clutch assembly of claim 2 in which said spring means are cylindrically formed springs and said weight means are spherically formed and received in said springs.

4. The clutch assembly of claim 1 in which the size and mass of said spring means are predetermined to cause said spring means to shift the direction in which said spring means draw said clutch shoes from a radial direction to a circumferential direction at a smaller angular velocity of the spider than is required to centrifugally actuate said clutch shoes to engagement with the interior wall of said drum 5. In a clutch assembly for controlling the transfer of rotation from a rotatable driving member to a rotatably mounted driven member, said driven member comprising a drum having a generally cylindrical interior wall generally concentric to the rotary axis of said driving member, said driving member comprising a spider having plural arms radiating outwardly at substantially equal angles toward said interior wall, a plurality of clutch shoes, said shoes disposed between alternate pairs of adjacently disposed arms, said shoes each having outer surface means adapted to frictionally engage said interior wall upon acceleration of said driving member to an adequate angular velocity, said shoes each having opposite end walls and, when engaged to the interior wall of said drum, subtending less than said equal angle between said opposite end walls, said shoes each having outrigger means providing spring anchors spaced circumferentially outwardly from said opposite end walls of said shoes, a plurality of tension springs each engaged at its ends in spring anchors of circumferentially adjacent shoes, said arms of said spider having radially outer clutch drivers received by said outrigger means between said spring anchors and said end walls.

6. The clutch assembly of claim 5 in which said end walls extend substantially radially of said interior wall from outer surface means when said clutch shoes are engaged to said interior wall, and in which said clutch drivers have substantially radially extending driver surfaces whereby said clutch drivers engage said clutch shoes over a substantially radially disposed contact area.

7. The clutch assembly of claim 5 in which the intermediate spaces between said alternate pairs of arms provide openings for outward extension of said tension springs toward said interior wall in response to centrifugal forces acting thereon.

8. The clutch assembly of claim 7 in which weight means retained by said tension spring increase the response of said springs to centrifugal forces acting thereon.

9. The clutch assembly of claim 5 in which said clutch shoes each have a notch axially traversing the outer surface thereof.

10. The clutch assembly of claim 9 in which said notches form sharp corners with said outer surface means and said end walls also form sharp corners with said outer surface means, said sharp corners effective to scrape debris from said interior wall during periods of slippage between said clutch shoes and said interior wall.

11. The clutch assembly of claim 5 in which said plural arms comprise four, said clutch shoes, when engaged to said interior wall, subtending less than 90° about said rotary axis, said outrigger means spacing the spring anchors of each shoe to cooperatively span more than 90° about said rotary axis.

12. The clutch assembly of claim 5 in which said outrigger means are fixedly mounted to said clutch shoes.

13. The clutch assembly of claim 5 in which said drum has annular closure means at one end thereof confronting said spider, said arms of said spider having air agitation wings extending axially toward said closure means.

14. The clutch assembly of claim 5 in which said drum is open on at least one end and terminates with a cylindrical overhang at said one end, said spider, through the medium of said springs, supporting said clutch shoes interiorly of said drum and remotely from said overhang, whereby said overhang provides a heat sink.

15. The clutch assembly of claim 5 in which said outrigger means comprise stirrups having spaced apart side arms secured to said clutch shoes by hollow rivets.

16. A clutch shoe for use in centrifugal clutch devices comprising an arcuate body member having inner and outer surface means each curved concentric to a common axis, said body member having axially spaced and generally parallel side walls between said inner and outer surface means, said side walls having axially inward indentations between said inner and outer surface means, said body member having axially disposed end walls extending between said side walls, a pair of stirrup members each having generally parallel side arms and a base extending between side arms, each side arm having a hook portion remote from said base, said stirrups disposed one at each end of said body member with said side arms of said stirrups seated in the inward indentations of said side walls, said hook portions wedged into said indentations, and rivet means engaging said hook portions to anchor said stirrups to said body member.

17. The clutch shoe assembly of claim 16 wherein said bases of said stirrups extend generally parallel to and are spaced from said end walls.

18. The clutch shoe assembly of claim 16 in which said body member is traversed between said side walls by a notch recessed inwardly of said outer surface means.

19. The clutch shoe assembly of claim 18 in which said end walls and said notch form sharp corners with said outer surface means.

* * * * *